May 21, 1935.  O. DUDA  2,001,818
VALVE MECHANISM
Filed June 30, 1932
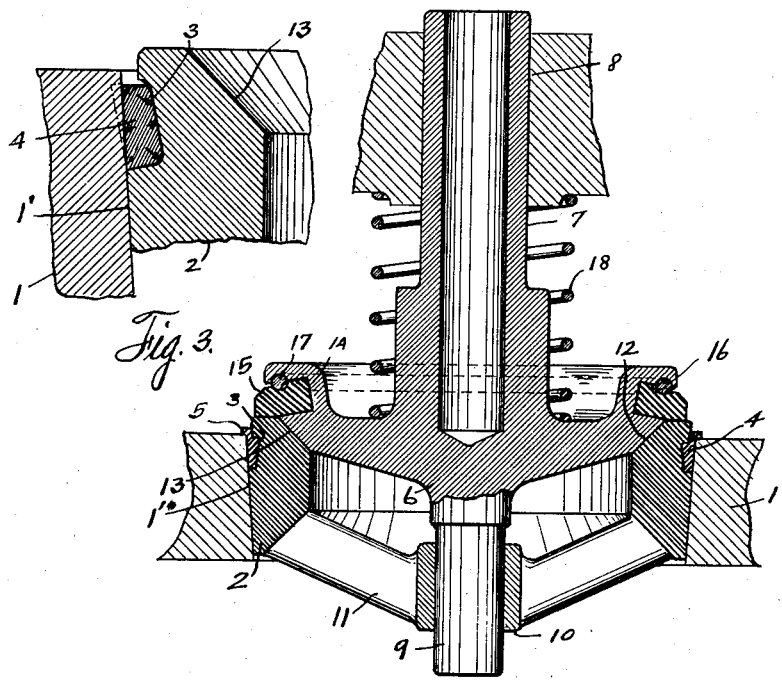
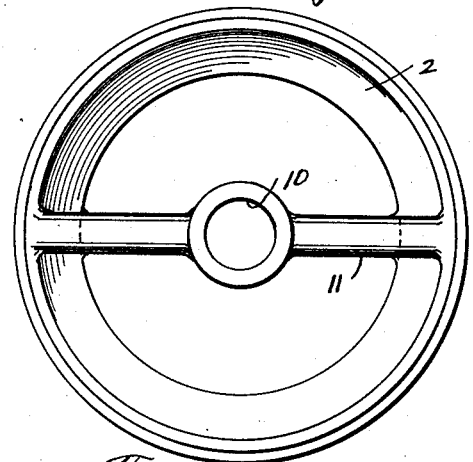
Inventor
Oswald Duda
By
Hardway Rather
Attorneys Patented May 21, 1935

2,001,818

UNITED STATES PATENT OFFICE 2,001,818

VALVE MECHANISM

Oswald Duda, Corsicana, Tex., assignor to American Well & Prospecting Company, Corsicana, Tex., a corporation of Texas Application June 30, 1932, Serial No. 620,122

2 Claims. (Cl. 251—144)

This invention relates to a valve mechanism.

An object of the invention is to provide a valve mechanism of the character described particularly designed for use in slush pumps and for similar purposes and having a novel type of packing exposed to the pressure of the fluid being pumped for packing the joint between the valve seat and the adjacent part of the pump wherein the valve mechanism is located.

Another object of the invention is to provide in a valve mechanism of the character described, a valve having an annular insert of rubber or similar resilient material retained in the valve in a novel manner and arranged to co-act with the valve seat to form a close fitting joint when the valve is seated.

Another object of the invention is to provide in a valve mechanism, a valve having a stem and a guide all formed integrally together.

With the above and other objects in view, the invention has particular relation to certain novel features of construction, arrangement of parts and use, an example of which is given in this specification and illustrated in the accompanying drawing, wherein:

Figure 1 shows a sectional view of the valve mechanism, as mounted in the pump.

Figure 2 shows a bottom plan view of the valve seat, and

Figure 3 shows an enlarged fragmentary transverse sectional view of the seat as mounted in the pump, showing the packing as subject to pressure.

Referring now more particularly to the drawing wherein like numerals of reference designate similar parts in each of the figures the numeral 1 designates a transverse partition of a slush pump which separates the inlet chamber from the discharge chamber of the pump. A plunger (not shown) works in the pump cylinder and draws the fluid to be pumped into the inlet chamber and forces the fluid under great pressure through the valve mechanism into the discharge chamber and thence out through the discharge line in a well known manner.

Driven or otherwise secured in the opening 1' of the partition there is an annular valve seat 2 with which the valve, hereinafter described, co-operates.

The upper end of the valve seat 2 is reduced so that when said seat is driven in place said upper end will be spaced from the partition 1 and this reduced upper end of said seat has an annular groove 3 therearound. Seated in this groove 3 there is an annular packing 4 formed of compressible material such as rubber. Normally this packing is approximately rectangular in cross sectional contour, as is indicated by the dotted lines in Figure 3, but when it is seated in the groove 3 and the seat 2 is driven into place the packing 4 will fill out partly or overflow the space produced by the groove 3 and the upper portion of partition 1, forming a lip 5, as shown in Figure 1 and in any case leaving a portion of the packing 4 exposed to the action of the fluid pressure, this pressure forcing the packing 4 down and outwardly against partition 1 and down and inwardly against seat 2, as shown in Figure 3 and a fluid tight joint between partition 1 and seat 2 will be formed effectively preventing any leakage of fluid.

There is a disc like valve 6 which has an upstanding stem 7, preferably tubular, which works through the bearing 8 above and this valve has a depending guide 9 which works through the bearing 10 of the spider 11 carried by the seat 2. The valve 6, stem 7 and guide 9 are preferably formed integrally. The valve has a tapering annular face 12 which opposes and is adapted to seat against the inwardly converging face 13 of the valve seat. The valve has an annular external groove 14 therearound in which is seated a ring 15 of yieldable material such as rubber and this ring extends out beyond the valve proper and is adapted to overlie, and to form a close fit against, the upper end of the valve seat when the valve is closed. The ring 15 is disposed so as to break the joint between the contacting faces 12, 13, when the valve is closed and is held firmly seated by the pressure of the fluid to prevent any leakage between the contacting faces 12, 13. The outer wall of the groove 14 has an annular keyway 16 therein and a ring like key 17 is seated in said keyway and presses into the material of the ring 15 so as to retain said ring securely in place.

There is a coil spring 18 which is not indispensable but which may be used if desired, to assist in seating the valve 6 and in holding the same closely seated.

It is obvious that mechanical changes may be made in the valve mechanism described without departing from the principle of the invention and it is not to be understood that the specific form shown must be necessarily adhered to since the drawing and description merely illustrate what is now considered to be a preferred form of the invention by way of illustration only, while the broad principle of the invention will be defined by the appended claims.

What I claim is:

1. In a valve mechanism a valve having an annular groove therearound, a resilient packing ring in said groove having a free margin which extends beyond the valve proper and having its inner margin thicker than said free margin, one wall of said groove having an annular half round recess and an annular lock ring placed in said recess and surrounding said thickened margin and pressing into the material of the packing ring to lock said packing ring in place.

2. In a valve mechanism a seat support having an opening to receive a valve seat, a valve seat in said opening and having an annular face and provided with an external counter-sunk surrounding groove which is inwardly widened, a valve arranged to cooperate with said seat and having a face arranged to cooperate with and to seat against said seat face, a resilient ring on the valve and having a free portion which extends beyond the valve and seats on the outer end of the seat, when the valve is seated, to break the joint between said faces and a packing ring in said groove seated closely between said support and seat, and located out beyond the valve, and whose outer end is exposed to the pressure of the liquid being pumped.

OSWALD DUDA.